United States Patent
Suzuki

(10) Patent No.: US 10,958,787 B2
(45) Date of Patent: *Mar. 23, 2021

(54) INFORMATION PROVIDING METHOD, INFORMATION PROVIDING SYSTEM, AND INFORMATION PROVIDING DEVICE

(71) Applicant: TOYOTA JIDOSHA KABUSHIKI KAISHA, Toyota (JP)

(72) Inventor: Koichi Suzuki, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/746,014

(22) Filed: Jan. 17, 2020

(65) Prior Publication Data

US 2020/0153966 A1 May 14, 2020

Related U.S. Application Data

(63) Continuation of application No. 16/058,245, filed on Aug. 8, 2018, now Pat. No. 10,574,821.

(30) Foreign Application Priority Data

Sep. 4, 2017 (JP) .............................. JP2017-169843

(51) Int. Cl.
*H04M 3/00* (2006.01)
*H04M 5/00* (2006.01)
(Continued)

(52) U.S. Cl.
CPC .......... *H04M 3/5183* (2013.01); *G08G 1/142* (2013.01); *H04M 2201/40* (2013.01); *H04M 2242/28* (2013.01); *H04M 2242/30* (2013.01)

(58) Field of Classification Search
CPC ........ G06Q 10/02; G06Q 10/04; G06Q 50/30; G08G 1/142; G08G 1/143; G08G 1/144;
(Continued)

(56) References Cited

U.S. PATENT DOCUMENTS 7,092,888 B1 * 8/2006 McCarthy ............. G10L 15/063
379/88.01
8,068,595 B2 * 11/2011 Odinak ............... H04M 3/5133
379/265.01
(Continued)

FOREIGN PATENT DOCUMENTS

JP H11-257979 A 9/1999
JP 2002-243471 A 8/2002
(Continued)

*Primary Examiner* — Khai N. Nguyen
(74) *Attorney, Agent, or Firm* — Hunton Andrews Kurth LLP

(57) ABSTRACT

An information providing method includes acquiring speech information indicating what a user tells an operator through a call, generating voice recognition data indicating a voice recognition result of the speech information by performing a voice recognition process on the acquired speech information, extracting first information on a desire of the user from the generated voice recognition data, acquiring second information associated with the first extracted information, and presenting the second acquired information to a terminal device that is used by the operator.

14 Claims, 6 Drawing Sheets

(51) Int. Cl.
*H04M 3/51* (2006.01)
*G08G 1/14* (2006.01)

(58) Field of Classification Search
CPC ... G08G 1/146; G08G 1/148; H04M 2201/40;
H04M 2242/28; H04M 2242/30; H04M
3/5183; H04W 4/024
USPC ............ 379/210.01, 265.01, 265.02, 265.03,
379/265.04, 265.05, 265.06, 265.07,
379/265.08, 265.09, 265.1, 265.11,
379/265.12, 265.13, 2, 65.14, 266.01,
379/266.02, 266.03, 266.04, 266.05,
379/266.06, 66.07, 266.08, 266.09, 266.1
See application file for complete search history.

(56) References Cited

U.S. PATENT DOCUMENTS

| | | | | |
|---|---|---|---|---|
| 8,244,536 | B2* | 8/2012 | Arun | G10L 15/22 |
| | | | | 704/270 |
| 9,224,394 | B2* | 12/2015 | Schalk | G10L 15/22 |
| 9,558,745 | B2* | 1/2017 | Schalk | G10L 15/22 |
| 10,356,245 | B2* | 7/2019 | Suzuki | H04M 3/58 |
| 10,574,821 | B2* | 2/2020 | Suzuki | G08G 1/143 |
| 2003/0125926 | A1* | 7/2003 | Claassen | G06F 16/3329 |
| | | | | 704/1 |
| 2003/0235282 | A1* | 12/2003 | Sichelman | G06Q 10/08355 |
| | | | | 379/201.03 |
| 2004/0117275 | A1* | 6/2004 | Billera | G10L 15/26 |
| | | | | 705/28 |
| 2005/0049859 | A1* | 3/2005 | Arun | G10L 15/22 |
| | | | | 704/231 |
| 2007/0088555 | A1* | 4/2007 | Layher | G06F 3/16 |
| | | | | 704/270 |
| 2007/0198272 | A1* | 8/2007 | Horioka | H04M 3/493 |
| | | | | 704/275 |
| 2008/0118051 | A1* | 5/2008 | Odinak | H04M 3/42221 |
| | | | | 379/265.09 |
| 2008/0154591 | A1* | 6/2008 | Kujirai | G10L 15/22 |
| | | | | 704/231 |
| 2009/0204400 | A1* | 8/2009 | Shields | G10L 15/26 |
| | | | | 704/246 |
| 2009/0204407 | A1* | 8/2009 | Shields | H04M 3/4933 |
| | | | | 704/270.1 |
| 2010/0205017 | A1* | 8/2010 | Sichelman | G06Q 10/1093 |
| | | | | 705/5 |
| 2010/0250243 | A1* | 9/2010 | Schalk | G06F 3/167 |
| | | | | 704/201 |
| 2011/0153322 | A1* | 6/2011 | Kwak | G10L 15/22 |
| | | | | 704/235 |
| 2014/0297281 | A1* | 10/2014 | Togawa | G10L 15/22 |
| | | | | 704/251 |
| 2016/0071518 | A1* | 3/2016 | Schalk | G06F 16/9537 |
| | | | | 704/270.1 |
| 2016/0371607 | A1* | 12/2016 | Rosen | G06Q 20/127 |
| 2017/0278023 | A1* | 9/2017 | Rosen | G08G 1/148 |
| 2017/0316534 | A1* | 11/2017 | Hirose | G06Q 10/087 |
| 2017/0316535 | A1* | 11/2017 | Hirose | G06Q 30/0645 |
| 2018/0029553 | A1* | 2/2018 | Hamakami | G08B 25/04 |
| 2019/0028592 | A1* | 1/2019 | Suzuki | G10L 17/22 |
| 2019/0075203 | A1* | 3/2019 | Suzuki | G08G 1/144 |
| 2019/0289131 | A1* | 9/2019 | Suzuki | G10L 17/22 |
| 2020/0153966 | A1* | 5/2020 | Suzuki | G06Q 10/04 |

FOREIGN PATENT DOCUMENTS

| | | |
|---|---|---|
| JP | 2007004000 A | 1/2007 |
| JP | 2009031810 A | 2/2009 |
| JP | 2011203349 A | 10/2011 |
| JP | 2011-227088 A | 11/2011 |
| JP | 2014-238289 A | 12/2014 |
| JP | 2015176099 A | 10/2015 |
| WO | 2015141700 A1 | 9/2015 |

\* cited by examiner

FIG. 2

| PARKING LOT NAME | ADDRESS | POSITION INFORMATION | TOTAL NUMBER OF VEHICLES THAT CAN BE PARKED | VACANCY SITUATION | PARKING SCHEME | RESTRICTION INFORMATION | PARKING FEE | HOURS OF OPERATION | ALLIANCE WITH FACILITY |
|---|---|---|---|---|---|---|---|---|---|
| ○○ PARKING LOT | ○○-SHI, ○○-KEN ... | N xx° xx' xx", E xxx° xx' xx" | 5 | 3 | SINGLE LEVEL PARKING | NONE | 300 YEN/h | 10:00 TO 22:00 | THERE IS DISCOUNT IN ○○ DEPARTMENT STORE |
| ○○ PARKING LOT | ○○-SHI, ○○-KEN ... | N xx° xx' xx", E xxx° xx' xx" | 10 | 0 | MULTILEVEL PARKING | HEIGHT: 1.6m | 400 YEN/h | 8:00 TO 20:00 | THERE IS DISCOUNT IN ○○ DEPARTMENT STORE |
| ○○ PARKING LOT | ○○-SHI, ○○-KEN ... | N xx° xx' xx", E xxx° xx' xx" | 25 | 15 | MULTILEVEL PARKING | HEIGHT: 1.6m WIDTH: 1.8m | 700 YEN/h | 24H | THERE IS DISCOUNT IN ○○ DEPARTMENT STORE |
| ... | ... | ... | ... | ... | ... | ... | ... | ... | ... |

FIG. 3

| USER ID | VEHICLE TYPE NAME, GRADE | DESIRED PARKING FEE | DESIRED PARKING SCHEME | DESIRE OF ALLIANCE WITH FACILITY |
|---|---|---|---|---|
| ID0001 | A VEHICLE, TYPE a | TO 300 YEN/h | MULTILEVEL PARKING | DESIRE |
| ID0002 | B VEHICLE, TYPE b | TO 600 YEN/h | SINGLE LEVEL PARKING | NO DESIRE |
| ID0003 | C VEHICLE, TYPE c | DO NOT MATTER | MULTILEVEL/SINGLE LEVEL PARKING | DESIRE |
| ⋮ | ⋮ | ⋮ | ⋮ | ⋮ |

# INFORMATION PROVIDING METHOD, INFORMATION PROVIDING SYSTEM, AND INFORMATION PROVIDING DEVICE

INCORPORATION BY REFERENCE

This is a continuation application of U.S. patent application Ser. No. 16/058,245, filed Aug. 8, 2018, now U.S. Pat. No. 10,574,821 which claims priority to the disclosure of Japanese Patent Application No. 2017-169843 filed on Sep. 4, 2017 including the specification, drawings and abstract is incorporated herein by reference in its entirety.

BACKGROUND

1. Technical Field

The present disclosure relates to an information providing method, an information providing system, and an information providing device.

2. Description of Related Art

A technology in which a user connects to a call center for a call using a vehicle-mounted device and performs a call with an operator for the call center, such that the user can request an operator to perform various works (for example, reservation of a facility, and setting of a destination of a navigation device), and receive various types of information provided from the operator (for example, facility information such as hotels, restaurants, or the like) is known.

Japanese Unexamined Patent Application Publication No. 2011-203349 (JP 2011-203349 A) discloses a technology in which speech information indicating content of speech transferred from a driver of a vehicle to an operator of a call center is acquired, a keyword (for example, an area or a genre) related to intentions of the driver is extracted from content of speech before and after a characteristic speech (for example, "May I help you?", "How can I help you today?", or "Yes, sir/ma'am") in a case where the characteristic speech is included in the acquired speech information, and automatic search for facility information (for example, a restaurant, a hotel, a convenience store, or a gas station) can be performed based on the extracted keyword. According to JP 2011-203349 A, even when the operator does not input a search word, the facility information is automatically searched, and therefore, it is said that work efficiency of the operator can be improved.

SUMMARY

However, in the above mentioned technology, it is possible to acquire predetermined information (for example, facility information) based on the speech information indicating the content of the speech that the user transfers to the operator through a call. However, it is not possible to acquire information associated with the predetermined information.

In an example of a destination setting of a navigation device, when a user transfers speech with content "I would like to go to Nagoya station" to an operator of a call center (hereinafter referred to as an "operator") through a call, the operator can manually input "Nagoya station" as a keyword to a system and set a position of a facility (that is, a position of Nagoya station) searched for by the system based on the input keyword, as a destination of a navigation device that the user uses. However, in this case, the user may prefer guidance to a parking lot present around Nagoya station rather than guidance to Nagoya station. Nevertheless, content spoken by the user is that "I would like to go to Nagoya station". Therefore, the operator cannot search for facility information of Nagoya station from the spoken content. Accordingly, it is not possible to search for parking lot information on a parking lot present around Nagoya station without performing additional work (for example, voice conversation with the user or an input work of search conditions).

The present disclosure provides an information providing method, an information providing system, and an information providing device capable of providing an operator with not only predetermined information but also information associated with the predetermined information based on speech information indicating content of speech that a user transfers to the operator through a call.

A first aspect of the present disclosure relates to an information providing method. The information providing method includes: acquiring, by an information provider, speech information indicating what a user tells an operator through a call; generating, by an information provider, voice recognition data indicating a voice recognition result of the speech information by performing a voice recognition process on the acquired speech information; extracting, by an information provider, first information on a desire of the user from the generated voice recognition data; acquiring, by an information provider, second information associated with the first extracted information; and presenting, by an information provider, the acquired second information to a terminal device that is used by the operator.

A second aspect of the present disclosure relates to an information providing system. The information providing system includes a vehicle-mounted device that is used by a user, a terminal device that is used by an operator, and an information provider. The information provider is configured to acquire speech information from the terminal device. The speech information indicates what the user tells the operator through a call from the vehicle-mounted device. The information provider is configured to generate voice recognition data indicating a voice recognition result of the speech information by performing a voice recognition process on the acquired speech information. The information provider is configured to extract first information on a desire of the user from the generated voice recognition data. The information provider is configured to acquire second information associated with the first extracted information. The information provider is configured to present the acquired second information to the terminal device.

A third aspect of the present disclosure relates to an information providing device including a processing circuit. The processing circuit is configured to acquire speech information indicating what a user tells an operator. The processing circuit is configured to generate voice recognition data indicating a voice recognition result of the speech information by performing a voice recognition process on the acquired speech information. The processing circuit is configured to extract first information on a desire of the user from the generated voice recognition data. The processing circuit is configured to acquire second information associated with the first extracted information. The processing circuit is configured to present the acquired second information to a terminal device that is used by the operator.

With this configuration, the first information on a desire of the user is extracted from the speech information indicating the content of the speech that the user has transferred to the operator through a call, and the second information associated with the first information is presented to the terminal device. Thus, according to the configuration, it is possible to provide an operator with not only predetermined information but also information associated with the predetermined information based on speech information what the user tells the operator through a call.

In the information providing method according to the first aspect of the present disclosure, the first information may be information on a facility, and the second information may be parking lot information on a parking lot present around the facility.

With this configuration, the information on the facility (for example, the facility name or the place name) is extracted as the first information on the desire of the user from the speech information what the user tells the operator through a call, and the parking lot information on the parking lot present around the facility is presented to the terminal device as the second information associated with the first information. Thus, according to the configuration, it is possible to provide an operator with not only predetermined information (information on the facility) but also information (parking lot information on a parking lot present around the facility) associated with the predetermined information based on speech information indicating content of speech that a user transfers to the operator through a call.

The information providing method according to the first aspect of the present disclosure may further include selecting, by the information provider, parking lot information on a parking lot available to the user among the parking lot information acquired as the second information. The information presented to the terminal device may be the selected parking lot information on the parking lot available to the user.

The information providing method according to the first aspect of the present disclosure may further include: acquiring, by the information provider, current place information indicating a current place of a vehicle of the user; and predicting, by the information provider, an arrival time at which the vehicle of the user arrives at the parking lot based on a route from the current place of the vehicle of the user to the parking lot. The route may be obtained based on the position information of the parking lot of which the parking lot information is acquired as the second information and the acquired current place information. The parking lot information may include a plurality of pieces of item information. First item information among the pieces of item information may be hours of operation information indicating hours of operation of the parking lot. The selected parking lot information on the parking lot available to the user may be parking lot information on a parking lot that is open for business at the time of arrival of the vehicle of the user, the parking lot information being selected based on the predicted arrival time, and hours of operation information included as the first item information among the parking lot information acquired as the second information. The information to be presented to the terminal device may be the selected parking lot information on the parking lot that is open for business at the time of arrival of the vehicle of the user.

In information providing method according to the first aspect of the present disclosure, the parking lot information may include a plurality of pieces of item information. Second item information among the pieces of item information may be vacancy situation information indicating a vacancy situation of the parking lot. The selected parking lot information on the parking lot available to the user may be parking lot information on a parking lot in which there is currently vacancy, the parking lot information being selected based on vacancy situation information included as the second item information in the parking lot information acquired as the second information. The information to be presented to the terminal device may be the selected parking lot information on the parking lot in which there is currently vacancy.

The information providing method according to the first aspect of the present disclosure may further include acquiring, by the information provider, vehicle information on a vehicle of the user. The parking lot information may include a plurality of pieces of item information. Third item information among the pieces of item information may be restriction information on restriction of the vehicle in the parking lot. The selected parking lot information on the parking lot available to the user may be parking lot information on a parking lot including the restriction information in which the vehicle of the user is parked, the parking lot information being selected based on the restriction information included as the third item information in the parking lot information acquired as the second information and the acquired vehicle information. Information to be presented to the terminal device may be the selected parking lot information on the parking lot at which the vehicle of the user is parked.

With this configuration, the parking lot information on a parking lot in which a user can actually park a vehicle (for example, a parking lot that is open for business at the time of arrival of the vehicle, a parking lot in which there is currently vacancy, and a parking lot in which the vehicle of the user can be parked) is presented to the terminal device. Accordingly, for example, the operator can introduce the parking lot in which the user can actually park the vehicle to the user based on the parking lot information presented to the terminal device. For example, the operator can set the parking lot in which the user can actually park the vehicle as a destination or a transit point of a navigation device used by the user. Therefore, according to this configuration, it is possible to provide parking lot information that is more useful to the user as information associated with the predetermined information.

The information providing method according to the first aspect of the present disclosure may further include determining, by the information provider, a priority based on a predetermined priority determination condition with respect to the parking lot information acquired as the second information, and presenting to the terminal device may be presenting the acquired parking lot information to the terminal device in a priority order determined based on the predetermined priority determination condition.

In the information providing method according to the first aspect of the present disclosure, the predetermined priority determination condition may include a condition in which parking lot information on a parking lot with a short distance from the facility is prioritized with respect to the acquired parking lot information.

In the information providing method according to the first aspect of the present disclosure, the predetermined priority determination condition may include a condition in which parking lot information on a parking lot with a low parking fee is prioritized with respect to the acquired parking lot information.

In the information providing method according to the first aspect of the present disclosure, the predetermined priority determination condition may include a condition in which parking lot information on a parking lot in which a user parks a vehicle using a desired parking scheme is prioritized with respect to the acquired parking lot information.

In the information providing method according to the first aspect of the present disclosure, the predetermined priority determination condition may include a condition in which parking lot information on a parking lot affiliated with the facility is prioritized with respect to the acquired parking lot information.

With this configuration, parking lot information on a parking lot adequate for a desire of the user (for example, a distance from the facility, a parking fee, a parking scheme, or alliance with the facility desired by the user) is preferentially presented to the terminal device. Accordingly, for example, the operator can preferentially introduce the parking lot adequate for the desire of the user based on the parking lot information presented to the terminal device. For example, the operator can set the parking lot adequate for the desire of the user as a destination or a transit point of a navigation device used by the user. Therefore, according to this configuration, it is possible to preferentially provide parking lot information that is more useful to the user as information associated with the predetermined information.

It is possible to provide an operator with not only predetermined information but also information associated with the predetermined information based on speech information indicating what the user tells the operator through a call.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is a diagram illustrating an example of parking lot information stored in a parking lot information DB according to the embodiment;

FIG. 3 is a diagram illustrating an example of preference information stored in a preference information DB according to the embodiment;

DETAILED DESCRIPTION OF EMBODIMENTS

Hereinafter, an information providing system of an embodiment of the present disclosure will be described with reference to the drawings.

System Configuration of Information Providing System 10

Figure 1:
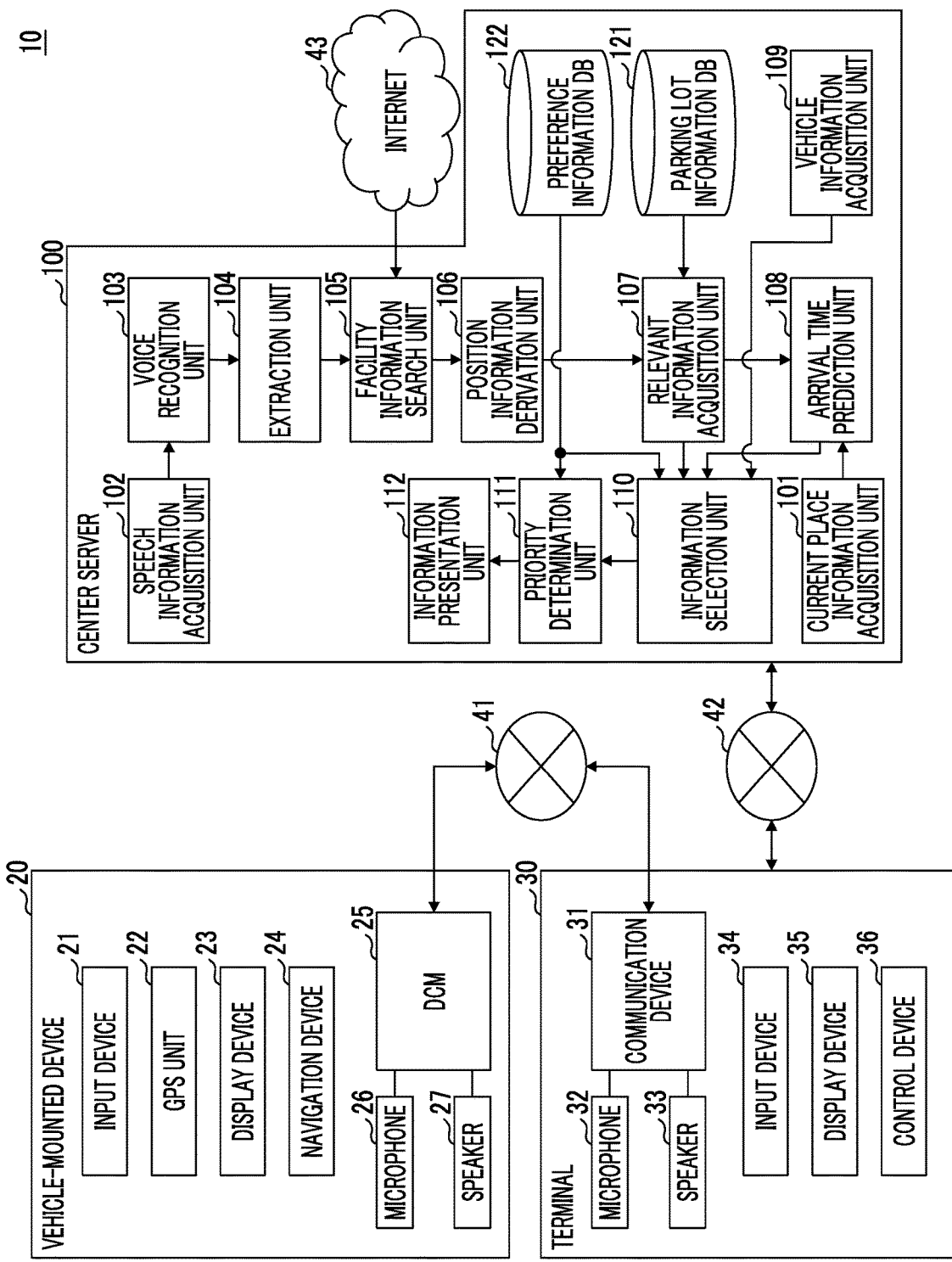
FIG. 1 is a diagram illustrating a system configuration of an information providing system according to an embodiment.

FIG. 1 is a diagram illustrating a system configuration of an information providing system 10 according to an embodiment of the present disclosure. The information providing system 10 illustrated in FIG. 1 includes a vehicle-mounted device 20, a terminal device 30, and a center server 100.

Vehicle-Mounted Device 20

The vehicle-mounted device 20 is a device that is mounted on a vehicle such as an automobile and used by a user that gets on the vehicle. As illustrated in FIG. 1, the vehicle-mounted device 20 includes an input device 21, a global positioning system (GPS) unit 22, a display device 23, a navigation device 24, a data communication module (DCM) 25, a microphone 26, and a speaker 27.

The input device 21 is a device that is provided, for example, in front of a driving seat in the vehicle, and is used when the user performs an input of various types of information to the vehicle-mounted device 20 (for example, selection of a start button for operator service). Examples of the input device 21 include a touch panel, an operation button, and a cross key.

The GPS unit 22 detects a current place (longitude and latitude) of the vehicle based on a GPS signal received from a GPS satellite. The GPS unit 22 outputs current place information indicating the current place of the vehicle.

The display device 23 is a device that is provided, for example, in front of the driving seat in the vehicle, and displays various types of information (for example, a map screen and a route guidance screen). Examples of the display device 23 include a liquid crystal display and an organic electro luminescence (EL) display.

The navigation device 24 performs search for a route from the current place of the vehicle detected by GPS unit 22 to a destination set by the user or operator and performs route guidance to the destination based on the route searched for through the route search. The route guidance of the navigation device 24 is accompanied by an output of a route guidance screen by the display device 23 and an output of route guidance voice by the speaker 27.

The DCM 25 is a so-called communication module and is a device capable of call processing and high-speed data communication with the terminal device 30 via a communication line 41 (for example, a mobile phone line). In the call processing performed by the DCM 25, when voice of the user is input from the microphone 26, voice data indicating content of the input voice is transmitted to the terminal device 30. In the call processing performed by the DCM 25, when the DCM 25 receives voice data indicating content of voice that the operator inputs to the terminal device 30, the voice of the operator based on the above voice data is output from the speaker 27. In the embodiment, the DCM 25 uses, for example, high-speed data communication with the terminal device 30 when transmitting the current place information output from the GPS unit 22 to the terminal device 30.

Although FIG. 1 illustrates one vehicle-mounted device 20, the information providing system 10 actually includes a plurality of vehicle-mounted devices 20 (each of which has the same configuration as the vehicle-mounted device 20 illustrated in FIG. 1) for each vehicle. That is, in the information providing system 10, it is possible to perform call processing and high-speed data communication with the terminal device 30 from each of the vehicle-mounted devices 20 (a plurality of users).

Terminal Device 30

The terminal device 30 is a device (for example, a personal computer) that is installed in a call center and used by the operator. As illustrated in FIG. 1, the terminal device 30 includes a communication device 31, a microphone 32, a speaker 33, an input device 34, a display device 35, and a control device 36.

The communication device 31 is a device that is communicatively connected to the vehicle-mounted device 20 via the communication line 41 and is capable of call processing and high-speed data communication with the vehicle-mounted device 20. In the call processing that is performed by the communication device 31, when the voice of the operator is input from the microphone 32, voice data indicating the content of the input voice is transmitted to the vehicle-mounted device 20. In the call processing that is performed by the communication device 31, when the communication device 31 receives voice data indicating content of voice that the user inputs to the vehicle-mounted device 20, voice of the user based on the voice data is output from the speaker 33 (for example, a speaker embedded into a headphone worn by the operator). The communication device 31 receives the current place information transmitted from the vehicle-mounted device 20 through the high-speed data communication with the vehicle-mounted device 20. The communication device 31 transmits the position information included in the facility information for a setting as a destination of the route guidance of the navigation device 24 and the position information included in the parking lot information for a setting as a transit point of the route guidance of the navigation device 24 to the vehicle-mounted device 20 through the high-speed data communication with the vehicle-mounted device 20.

The input device 34 is a device that is used when the operator inputs various types of information to the terminal device 30 (for example, input of search conditions when information to be provided to the user is searched for). Examples of the input device 34 include a keyboard, a mouse, and a touch panel.

The display device 35 is a device that displays various types of information (for example, various operation screens, facility information to be provided to the user, and parking lot information). Examples of the display device 35 include a liquid crystal display and an organic EL display.

The control device 36 performs various controls in the terminal device 30. For example, when the communication device 31 receives the connection request and the current place information transmitted from the vehicle-mounted device 20, the control device 36 stores the current place information in the memory and notifies the operator of the reception of the connection request from the vehicle-mounted device 20. For example, the control device 36 transmits speech information indicating content of speech of the user acquired from the vehicle-mounted device 20 by the communication device 31 together with the current place information stored in the memory to the center server 100 over a communication network 42 (for example, the Internet, a local area network (LAN), or a wide area network (WAN)). For example, when the parking lot information and the facility information transmitted from the center server 100 are received by the communication device 31, the control device 36 displays the parking lot information and the facility information on the display device 35 and presents the parking lot information and the facility information to the operator. Further, when the operator performs a predetermined transmission operation, the control device 36 transmits the position information (latitude and longitude) included in the facility information provided from the center server 100 and the position information (latitude and longitude) included in the parking lot information provided from the center server 100 to the vehicle-mounted device 20 via the communication device 31. As described above, the control device 36 can set, for the vehicle-mounted device 20, the position of the facility that the user desires as a destination in the route guidance of the navigation device 24, and set the position of the parking lot present around the facility desired by the user as a transit point in the route guidance of the navigation device 24.

Although FIG. 1 illustrates one terminal device 30, the information providing system 10 includes a plurality of terminal devices 30 (each of the terminal devices 30 is the same configuration as the terminal device 30 illustrated in FIG. 1) for each operator. That is, in the information providing system 10, it is possible to perform call processing and high-speed data communication with the vehicle-mounted device 20 from each of the terminal devices 30.

Center Server 100

The center server 100 is an example of an "information provider." The center server 100 is a device that is installed in a facility (for example, a call center) external to the vehicle. The center server 100 can acquire the speech information that indicates what the user tells the operator from the terminal device 30 over a communication network 42 and perform a voice recognition process on the speech information. The center server 100 can specify a facility that the user desires as the destination based on voice recognition data indicating a voice recognition result generated through the voice recognition process, and provide the parking lot information on the parking lot present around the facility to the terminal device 30 of the operator in addition to the facility information on the facility.

As illustrated in FIG. 1, the center server 100 includes a parking lot information database (DB) 121, a preference information DB 122, a current place information acquisition unit 101, a speech information acquisition unit 102, a voice recognition unit 103, an extraction unit 104, a facility information search unit 105, a position information derivation unit 106, a relevant information acquisition unit 107, an arrival time prediction unit 108, a vehicle information acquisition unit 109, an information selection unit 110, a priority determination unit 111, and an information presentation unit 112, as processing circuits.

The center server 100 includes hardware such as a central processing unit (CPU), a main storage device (for example, a read only memory (ROM), or a random access memory (RAM)), and an auxiliary storage device (for example, a hard disk drive (HDD) or a flash memory). Each of the functions of the center server 100 described above is realized by, for example, a CPU (computer) executing a program stored in a main storage device or an auxiliary storage device, in the center server 100.

The program executed by the CPU may be provided in a state in which the program is introduced to the center server 100 in advance or may be provided from the outside and introduced to the center server 100. In the latter case, the program may be provided by a computer-readable storage medium (for example, a universal serial bus (USB) memory, a memory card, or a CD-ROM) or may be downloaded and provided from a server on a network (for example, the Internet).

The center server 100 may be physically constituted by one information processing device or may be physically constituted by a plurality of information processing devices. In the latter case, the information processing devices may be connected to each other over a network.

The parking lot information DB 121 stores a plurality of pieces of parking lot information for each parking lot. Each piece of parking lot information stored in the parking lot information DB 121 includes a plurality of pieces of item information. For example, each of piece of parking lot information stored in the parking lot information DB 121 includes item information such as a parking lot name, an address, position information (latitude and longitude), a total number of vehicles that can be parked, a vacancy situation (second item information), a parking scheme, restriction information (third item information) a parking fee, hours of operation (first item information), and alliance with facilities. Specific examples of the parking lot information stored in the parking lot information DB 121 will be described below with reference to FIG. 2.

The preference information DB 122 stores a plurality of pieces of preference information for each user (specifically, for each user identifier (ID) assigned to each user). Each piece of preference information stored in the preference information DB 122 includes a plurality of pieces of item information. For example, each of the piece of preference information stored in the preference information DB 122 includes item information such as a user ID, a vehicle type name, a grade, a desired parking fee, a desired parking scheme, and a desire for alliance with a facility. Specific examples of the preference information stored in the preference information DB 122 will be described below with reference to FIG. 3.

The current place information acquisition unit 101 acquires the current place information indicating the current place of the vehicle on which the vehicle-mounted device 20 is mounted. For example, when the DCM 25 of the vehicle-mounted device 20 makes a call connection with the terminal device 30, the DCM 25 transmits the current place information indicating the current place of the vehicle output from the GPS unit 22 to the terminal device 30. The control device 36 of the terminal device 30 transfers the current place information acquired from the vehicle-mounted device 20 to the center server 100 over the communication network 42. In addition, the current place information acquisition unit 101 acquires the current place information transmitted from the terminal device 30, over the communication network 42.

The speech information acquisition unit 102 acquires, from the terminal device 30 of the operator, speech information (hereinafter referred to as "speech information of the user") indicating what the user tells the operator through a call from the vehicle-mounted device 20. For example, the control device 36 of the terminal device 30 transfers the speech information of the user acquired from the vehicle-mounted device 20, to the center server 100 over the communication network 42. In addition, the speech information acquisition unit 102 acquires the speech information of the user transmitted from the terminal device 30, over the communication network 42.

The voice recognition unit 103 generates voice recognition data indicating a voice recognition result of the speech information by performing a known voice recognition process on the speech information acquired by the speech information acquisition unit 102.

The extraction unit 104 extracts information on desire of the user (first information) from the voice recognition data generated by the voice recognition unit 103. In the embodiment, the information on the desire of the user is a facility name, a place name, or the like of a facility that the user desires as a destination. For example, the extraction unit 104 divides the voice recognition data into the morphemes (words, parts of speech, or the like) by performing a known morpheme analysis process (so-called annotator processing). The extraction unit 104 performs a known semantic analysis process on the voice recognition data divided into a plurality of morphemes to extract the facility name, the place name, or the like that the user desires as a destination. For example, when the voice recognition data includes a character string such as "I would like to go to an ABC department store in Nagoya city", the extraction unit 104 extracts "Nagoya city, ABC department store" as the facility name and the place name that the user desires as a destination. The extraction unit 104 may extract solely the facility name (for example, "ABC department store") from the voice recognition data or may extract an abbreviation (for example, "ABC") of the facility name.

The facility information search unit 105 fuzzy-searches for the facility information from the Internet 43 using the facility name and the place name extracted by the extraction unit 104 as search keywords. The "fuzzy-search of the facility information" means that the facility information that does not completely match the search keywords is caused to be included in a search result. For example, when "Nagoya station" is used as a search keyword, the facility information search unit 105 performs fuzzy-search so that not only facility information including a character string "Nagoya station" but also facility information including a similar character string such as abbreviated name of the facility is included in the search result.

The position information derivation unit 106 derives the position information of the facility that the user desires as a destination based on the facility information searched by the facility information search unit 105. Specifically, the position information derivation unit 106 first selects the facility information with the highest reliability among the pieces of facility information searched for from the Internet 43 by the facility information search unit 105.

For example, the position information derivation unit 106 decides whether or not a predetermined keyword is included in each of a character string of a portion with a <title> tag and a character string of a portion with a <h> tag with respect to each of the pieces of facility information searched for from the Internet 43 by the facility information search unit 105. The predetermined keyword is, for example, a character string which contributes to improvement of reliability of the facility information, such as "official", "company", "store", "clinic", or "hospital". When the position information derivation unit 106 decides that the predetermined keyword is included, the position information derivation unit 106 increases the reliability of the facility information.

For example, the position information derivation unit 106 decides whether or not an emphasis tag (for example, <strong>, <em>, <b>, or <font>) is attached to each of the character string of the portion with the <title> tag and the character string of the portion with the <h> tag. When the position information derivation unit 106 decides that the emphasis tag is attached, the position information derivation unit 106 increases the reliability of the facility information.

The position information derivation unit 106 finally selects the facility information with the highest reliability as a result of performing the process of increasing the reliability as described above, as the facility information with the highest reliability.

Further, the position information derivation unit 106 extracts an address character string indicating an address of the facility that the user desires as a destination from the facility information selected as the facility information with the highest reliability. For example, the position information derivation unit 106 extracts a character string to which a predetermined tag indicating an address is assigned (for example, <address>), a character string to which a predetermined keyword indicating an address (for example, "address:") is assigned, a character string matching a predetermined format regarding an address (for example, "xx-city, xx-prefecture"), or the like as the address character string indicating the address of the facility that the user desires as a destination.

The position information derivation unit 106 performs geocoding using the address character string extracted from the facility information as an input parameter to thereby acquire the position information (latitude and longitude) corresponding to the address character string as the position information of the facility that the user desires as the destination. For example, the position information derivation unit 106 can acquire the position information (latitude and longitude) corresponding to the address character string by executing an application programming interface (API) for geocoding provided from a specific institution.

The relevant information acquisition unit 107 searches for parking lot information on the parking lot present around the position indicated by the position information derived by the position information derivation unit 106 (that is, the position of the facility that the user desires as the destination) from the parking lot information DB 121 based on the position information derived by the position information derivation unit 106 and the position information indicating the position of the parking lot included in each piece of parking lot information stored in the parking lot information DB 121. Here, the relevant information acquisition unit 107 can search for the pieces of parking lot information from the parking lot information DB 121. For example, the relevant information acquisition unit 107 may search for a predetermined number (for example, five) of pieces of parking lot information in an order from the position indicated by the position information derived by the position information derivation unit 106 from the parking lot information DB 121. For example, the relevant information acquisition unit 107 searches for the pieces of parking lot information regarding parking lots present within a predetermined distance range (for example, within a radius of 1 km) from the position indicated by the position information derived by the position information derivation unit 106 from the parking lot information DB 121.

For the parking lot of which the parking lot information is acquired by the relevant information acquisition unit 107, the arrival time prediction unit 108 predicts an arrival time at which the vehicle of the user arrives at the parking lot. For example, the arrival time prediction unit 108 searches for a route (for example, a route according to a standard search condition) from the current place of the vehicle of the user to the parking lot using a known route search scheme based on the position information (included in the parking lot information in the embodiment) of the parking lot of which the parking lot information is acquired by the relevant information acquisition unit 107 and the current place information acquired by the current place information acquisition unit 101. The arrival time prediction unit 108 calculate a movement time from the current place of the vehicle of the user to the parking lot based on the route that has been searched for, using a known calculation method, and adds the calculated movement time to the current time to predict the arrival time at which the vehicle of the user arrives at the parking lot.

The vehicle information acquisition unit 109 acquires the vehicle information on the vehicle of the user. For example, the vehicle information acquisition unit 109 specifies the vehicle type name and the grade of the vehicle of the user by referring to the preference information of the user stored in the preference information DB 122. The vehicle information acquisition unit 109 acquires vehicle information corresponding to the specified vehicle type name and the specified grade from an external vehicle information database (not illustrated) as the vehicle information on the vehicle of the user. The vehicle information on the vehicle of the user includes, for example, information such as a height, a width, a length, and a weight of the vehicle.

The information selection unit 110 selects the parking lot information on the parking lot available to the user among the parking lot information searched for from the parking lot information DB 121 by the relevant information acquisition unit 107. For example, the information selection unit 110 selects the parking lot information on the parking lot that is open for business at the time of arrival of the vehicle of the user based on the arrival time predicted by the arrival time prediction unit 108 and the hours of operation information included in the parking lot information acquired by the relevant information acquisition unit 107. For example, the information selection unit 110 selects the parking lot information on the parking lot in which there is currently vacancy based on the vacancy situation information included in the parking lot information acquired by the relevant information acquisition unit 107. For example, the information selection unit 110 selects the parking lot information for the parking lot including the restriction information in which the vehicle of the user can be parked based on the restriction information (for example, a height, a width, a length, and a weight) included in the parking lot information acquired by the relevant information acquisition unit 107 and the vehicle information (similarly, a height, a width, a length, and a weight) acquired by the vehicle information acquisition unit 109.

The priority determination unit 111 determines the priority of the parking lot information selected by the information selection unit 110 (parking lot information on the parking lot available to the user) based on a predetermined priority determination condition.

For example, the priority determination unit 111 may specify the priority based on a first priority determination condition in which a parking lot with a short distance from the facility desired by the user is prioritized with respect to the parking lot information selected by the information selection unit 110. For example, the priority determination unit 111 determines can specify the distance from the facility desired by the user to the parking lot based on the position information of the facility desired by the user (for example, the position information derived by the position information derivation unit 106) and the position information included in the parking lot information.

For example, the priority determination unit 111 determines the priority based on a second priority determination condition in which a parking lot with a low parking fee is prioritized with respect to the parking lot information selected by the information selection unit 110. For example, the priority determination unit 111 calculates a parking fee for a predetermined parking time (for example, one hour) based on the information on the parking fee included in the parking lot information, and determines the priority based on the parking fee.

For example, the priority determination unit 111 determines the priority based on a third priority determination condition in which a parking lot in which the user can park a vehicle using a desired parking scheme is prioritized with respect to the parking lot information selected by the information selection unit 110. For example, the priority determination unit 111 refers to the preference information of the user stored in the preference information DB 122. When a specific parking scheme (for example, single level parking garage or a multilevel parking garage) is set in the information on the desired parking scheme included in the preference information, the priority determination unit 111 specifies the specific parking scheme as a parking scheme desired by the user. When the parking scheme desired by the user is indicated in the information on the parking scheme included in the parking lot information, the priority determination unit 111 prioritizes the parking lot information as the parking lot information on the parking lot in which the user can perform parking using the parking scheme desired by the user.

For example, the priority determination unit 111 determines the priority based on a fourth priority determination condition in which a parking lot affiliated with the facility desired by the user is prioritized with respect to the parking lot information selected by the information selection unit 110. For example, when content of the alliance with the facility desired by the user (for example, a discount service for a parking fee) is indicated in the alliance information included in the parking lot information, the priority determination unit 111 prioritizes the parking lot information as the parking lot information on the parking lot affiliated with the facility desired by the user. However, the priority determination unit 111 refers to the preference information of the user stored in the preference information DB 122 and does not perform the determination of the priority according to the third priority determination condition when no-desire of the use of the alliance with the facility is set in the information on the desire for alliance with the facility included in the above preference information.

The information presentation unit 112 presents the parking lot information selected by the information selection unit 110 in the parking lot information acquired by the relevant information acquisition unit 107 to the terminal device 30 of the operator in the priority order determined by the priority determination unit 111. Specifically, the information presentation unit 112 transmits the parking lot information selected by the information selection unit 110 to the terminal device 30 over the communication network 42 in a state in which the priority determined by the priority determination unit 111 can be identified. Accordingly, the information presentation unit 112 can display the parking lot information selected by the information selection unit 110 on the display device 35 of the terminal device 30 in the priority order determined by the priority determination unit 111.

Example of Parking Lot Information

FIG. 2 is a diagram illustrating an example of parking lot information stored in the parking lot information DB 121 according to the embodiment. As illustrated in FIG. 2, the pieces of parking lot information is stored in the parking lot information DB 121. In the example illustrated in FIG. 2, each piece of parking lot information includes "parking lot name", "address", "position information (latitude and longitude)", "total number of vehicles that can be parked", "vacancy situation", "parking scheme", "restriction information", "parking fee", "hours of operation", and "alliance with a facility" as item information. For the "parking scheme" among them, for example, "multilevel parking garage" or "single level parking garage" is set. For the "restriction information", information on restrictions of a vehicle that can be parked (for example, a height, a width, a length, or a weight) is set. The "vacancy situation" indicates a current vacancy situation, and a value changes in real time according to a usage situation of the parking lot by interlocking with a management system of the parking lot, or the like. For the "alliance with the facility", information on a discount of the parking fee when a specific facility is used, or the like is set. The parking lot information DB 121 configured as described above is used, for example, when the parking information on a parking lot present around the facility that the user desires as a destination is searched for by the relevant information acquisition unit 107.

Example of Preference Information

FIG. 3 is a diagram illustrating an example of the preference information stored in the preference information DB 122 according to the embodiment. As illustrated in FIG. 3, the pieces of preference information for each user ID is stored in the preference information DB 122. In the example illustrated in FIG. 3, each piece of preference information includes "user ID", "vehicle type name, grade", "desired parking fee", "desired parking scheme", and "presence or absence of desire of alliance with a facility" as item information. The preference information DB 122 configured as described above is used, for example, when the priority determination unit 111 determines the priority of the parking lot information according to the preference of the user. The preference information DB 122 is used, for example, when the information selection unit 110 selects the parking lot information on the parking lot at which the vehicle of the user can be parked. Here, for the "vehicle type name, grade", vehicle information on a vehicle (for example, a height, a width, a length, or a weight) is associated with an external vehicle information database (not illustrated), and a decision is made as to whether or not the vehicle of the user can be parked in the parking lot based on the vehicle information. The vehicle information is not limited to the acquisition from the outside and may be set in each piece of preference information in the preference information DB 122. For the "desired parking fee", an upper limit of a parking fee desired by a user (for example, up to 400 yen per hour) is set. For the "desired parking scheme", a parking scheme (for example, multilevel parking garage or single level parking garage) desired by the user is set. For the "Presence or absence of desire of alliance with the facility, a desire of the user regarding whether or not the user preferentially uses the parking lot having alliance with the facility desired by the user is set.

Procedure of Process in Information Providing System 10

Figure 4:
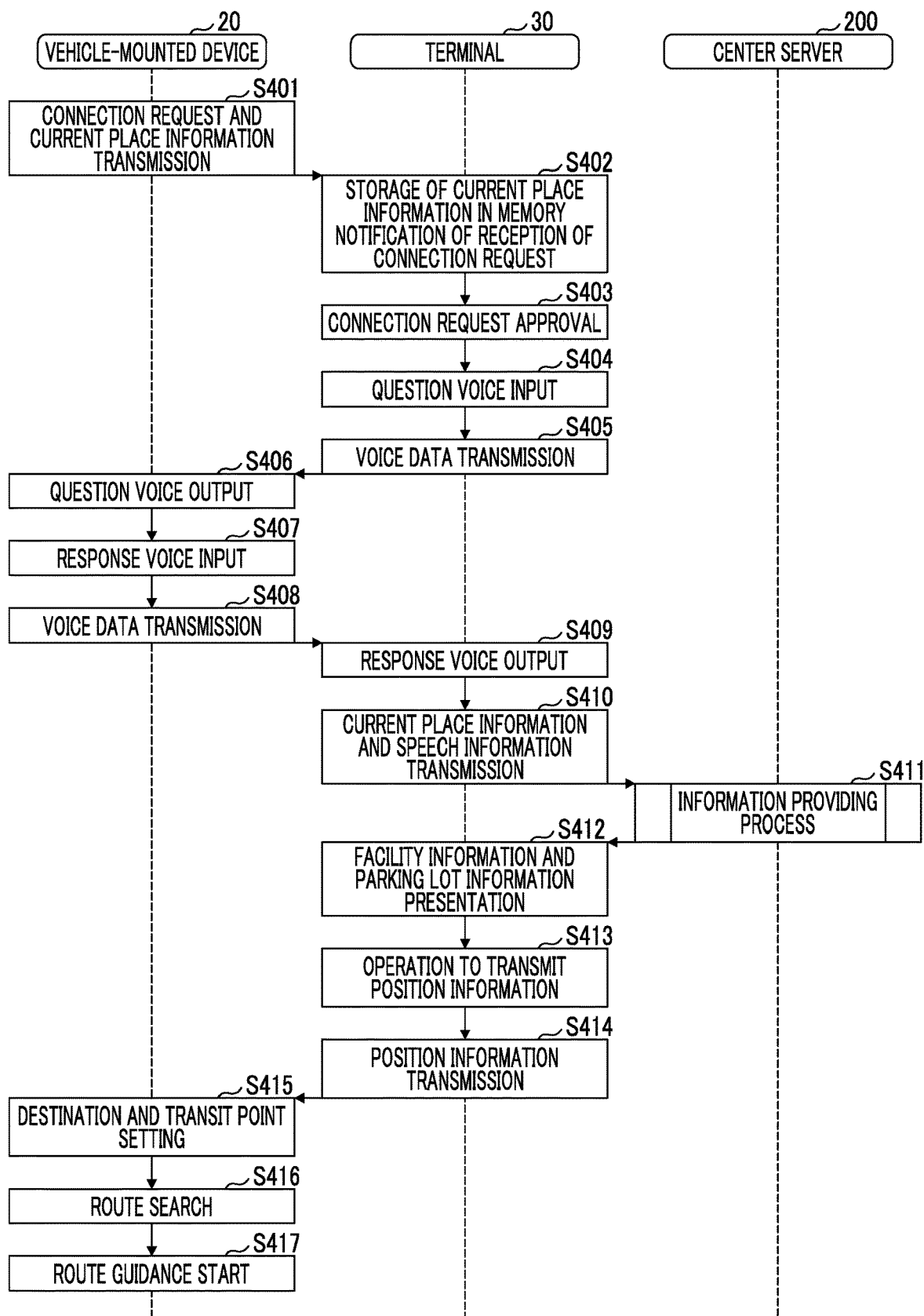
FIG. 4 is a sequence diagram illustrating a procedure of a process in the information providing system according to the embodiment.

FIG. 4 is a sequence diagram illustrating a procedure of a process in the information providing system 10 according to the embodiment. The process in FIG. 4 is started, for example, when the start button for an operator service displayed on the display device 23 is selected by the user in the vehicle-mounted device 20.

First, the DCM 25 of the vehicle-mounted device 20 transmits a call connection request to the terminal device 30 via the communication line 41 and simultaneously transmits current place information indicating the current place of the vehicle obtained from the GPS unit 22 (step S401). In the terminal device 30, when the communication device 31 receives the connection request and the current place information transmitted from the vehicle-mounted device 20, the control device 36 stores the current place information in the memory and also notifies the operator that the connection request has been received from the vehicle-mounted device 20 (step S402). For example, the control device 36 notifies the operator that the connection request has been received from the vehicle-mounted device 20 by displaying a predetermined incoming call screen on the display device 35 or outputs a predetermined ringtone from the speaker 33.

In the terminal device 30, for example, when the operator performs a predetermined off-hook operation (for example, an operation of depressing a response button displayed on the display device 35) according to the notification of the reception of the connection request, the communication device 31 approves the connection request transmitted from the vehicle-mounted device 20 (step S403). Accordingly, the DCM 25 of the vehicle-mounted device 20 and the communication device 31 of the terminal device 30 are connected for a call, and calling between the user and the operator is started.

In a call between the user and the operator, when the operator first utters voice to ask for the desire of the user (for example, "This is an call center," "How can I help you?", which is hereinafter referred to as "question voice"), the question voice is input to the communication device 31 from the microphone 32 to the user (step S404), and the voice data of the question voice is transmitted to the vehicle-mounted device 20 by the communication device 31 (step S405). Thus, in the vehicle-mounted device 20, the question voice is output from the speaker 27 (step S406).

When the user utters voice indicating desired content according to the output question voice (for example, "I would like to go to an ABC department store in Nagoya city", which is hereinafter, "response voice"), the response voice is input from the microphone 26 to the DCM 25 (step S407), and voice data of the response voice is transmitted to the terminal device 30 by the DCM 25 (step S408). Thus, in the terminal device 30, the response voice is output from the speaker 33 (step S409).

The control device 36 of the terminal device 30 transmits the voice data of the response voice acquired from the vehicle-mounted device 20 together with the current place information stored in the memory to the center server 100, as speech information indicating what the user tells the operator through the call, over the communication network 42 (step S410).

The center server 100 performs an information providing process (which will be described in detail with reference to FIG. 5) based on the speech information and the current place information transmitted from the terminal device 30 (step S411). Accordingly, the center server 100 generates voice recognition data indicating the voice recognition result of the speech information by performing the voice recognition process on the speech information. The center server 100 extracts information on the facility that the user desires as a destination (for example, a facility name or a place name) from the voice recognition data generated through the voice recognition process, searches for the facility information on the facility that the user desires as a destination from the Internet 43 using the extracted information as a search keyword to acquire the facility information, and also acquires the parking lot information on the parking lot present around the facility that the user desires as a destination from the parking lot information DB 121. The center server 100 transmits the acquired parking lot information and the acquired facility information to the terminal device 30 over the communication network 42.

In the terminal device 30, when the communication device 31 receives the parking lot information and the facility information transmitted from the center server 100, the control device 36 displays the parking lot information and the facility information on the display device 35 to present the parking lot information and the facility information to the operator (step S412).

The operator tells the content of the parking lot information and the facility information presented to the operator to the user through a call with the user. The operator confirms, to the user through a call with the user, whether or not the parking lot information and the facility information to be presented to the operator are to be used to set the destination and the transit point in the route guidance of the navigation device 24. Here, when the pieces of parking lot information are presented to the operator, the operator confirms, to the user through a call with the user, whether or not the parking lot information of any one of the pieces of parking lot information is to be used for the route guidance of the navigation device 24.

When the confirmation as to "whether or not the parking lot information and the facility information are to be used to set the destination and the transit point in the route guidance of the navigation device 24" is obtained from the user, the operator performs a predetermined transmission operation with respect to the terminal device 30 to transmit position information of each of the parking lot information and the facility information to be presented to the operator to the vehicle-mounted device 20 (step S413). Accordingly, the communication device 31 of the terminal device 30 transmits the position information included in the parking lot information to be presented to the operator (parking lot information selected by the user from the pieces of parking lot information when the pieces of parking lot information are presented to the operator) and the position information included in the facility information to be presented to the operator to the vehicle-mounted device 20 via the communication line 41 (step S414).

As a result, in the navigation device 24 of the vehicle-mounted device 20, the position of the facility that the user desires as the destination is set as the destination of the route guidance, and the position of the parking lot present around the facility that the user desires as a destination is set as a transit point of the route guidance (step S415).

The navigation device 24 searches for a route from the current place of the vehicle detected by the GPS unit 22 to the destination (the facility that the user desires as the destination) set in step S415 through the transit point (parking lot) set in step S415 (step S416). Here, the search condition (for example, distance priority or general road priority) may be able to be set by the user, as in route search of a general navigation device, or a plurality of routes with different search conditions may be searched for. The user may be able to select one route among the routes searched for.

Thereafter, the navigation device 24 performs the route guidance based on the route searched for in step S416 (step S417). The user can cause the vehicle to be traveled according to the route guidance and reach the parking lot present around the desired facility.

When the user moves on foot from the parking lot to the desired facility after parking the vehicle in the parking lot, the user can confirm a route from the parking lot to the desired facility, for example, through a display screen displayed on the vehicle-mounted device 20. Or, the user can confirm the route from the parking lot to the desired facility on a screen of a mobile terminal (for example, a smart phone or a tablet terminal) carried by the user, for example, by connecting a mobile terminal to the vehicle-mounted device 20 and causing a route set in the vehicle-mounted device 20 to be taken over to the mobile terminal.

Procedure for Information Providing Process in Center Server 100

Figure 5:
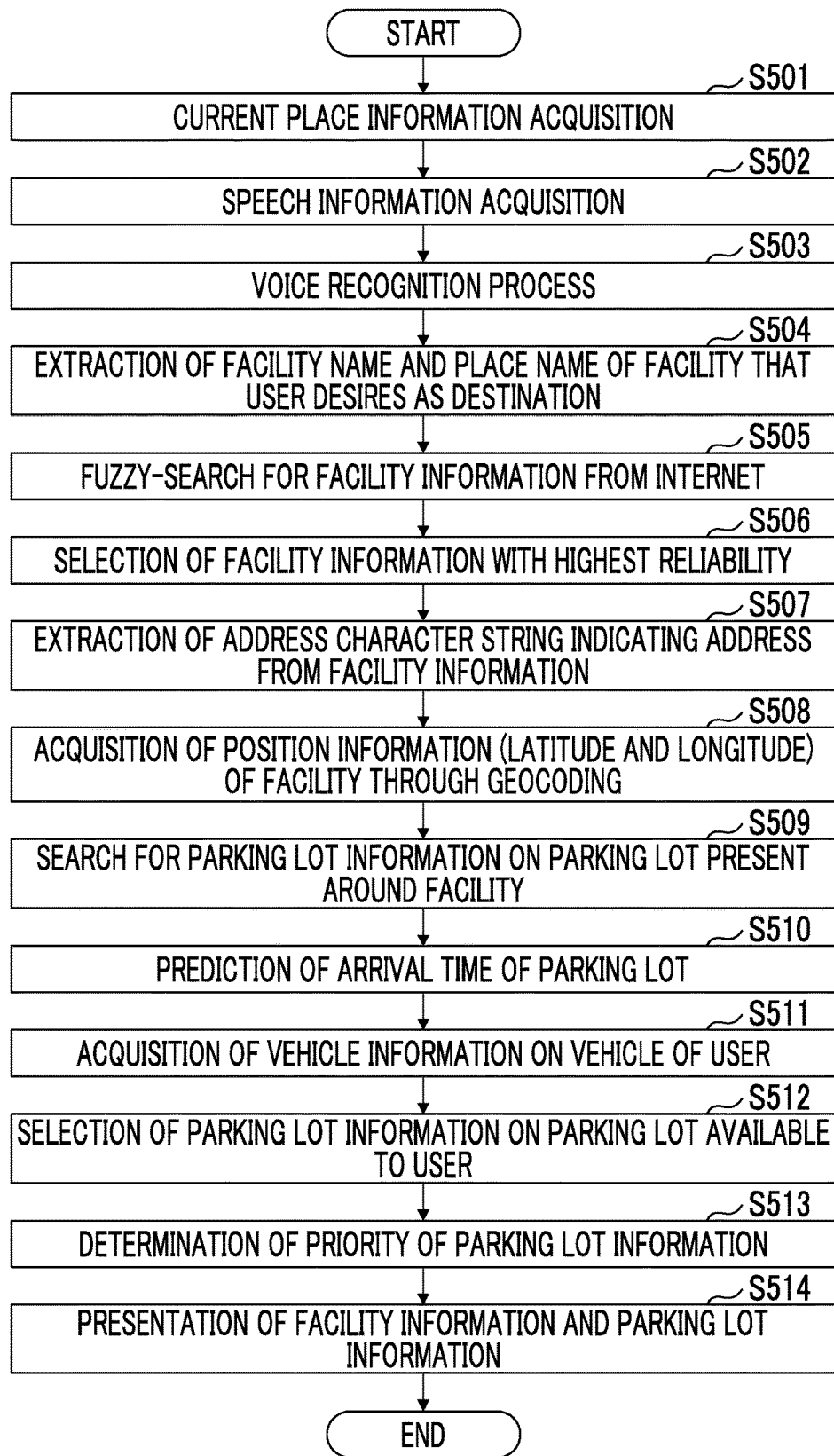
FIG. 5 is a flowchart illustrating a procedure of an information providing process in a center server according to the embodiment.

FIG. 5 is a flowchart illustrating a procedure of the information providing process in the center server 100 according to the embodiment. FIG. 5 is a diagram illustrating the information providing process of step S411 in the sequence diagram of FIG. 4 in detail.

First, the current place information acquisition unit 101 acquires the current place information (current place information indicating the current place of the vehicle of the user) transmitted from the terminal device 30 over the communication network 42 (step S501: current place acquisition step).

The speech information acquisition unit 102 acquires speech information of the user transmitted from the terminal device 30 (that is, speech information indicating the content of the speech that the user has told the operator through a call) over the communication network 42 (step S502: speech information acquisition step).

The voice recognition unit 103 generates voice recognition data indicating the voice recognition result of the speech information by performing a known voice recognition process on the speech information of the user acquired in step S502 (step S503: voice recognition step). For example, when the speech information acquired in step S502 indicates the content of the speech of the user "I would like to go to an ABC department store in Nagoya city", the voice recognition unit 103 generates voice recognition data including a character string "I would like to go to an ABC department store in Nagoya city".

The extraction unit 104 extracts the facility name and the place name regarding the facility that the user desires as a destination from the voice recognition data generated in step S503 (step S504: extraction step). For example, when a voice text generated in step S503 includes a character string "I would like to go to an ABC department store in Nagoya city", the extraction unit 104 extracts "Nagoya city and ABC department store" as the facility name and the place name regarding the facility that the user desires as a destination.

The facility information search unit 105 fuzzy-searches for the facility information from the Internet 43 using the facility name and the place name extracted in step S504 as search keywords (step S505). For example, when the facility name and the place name extracted in step S504 are "Nagoya city and ABC department store", the facility information search unit 105 searches for not only the facility information including character string completely matching the above search keyword, but also the facility information including the character string (for example, "Nagoya" or "ABC") similar to the above search keywords from the Internet 43 using "Nagoya city and ABC department store" as search keywords.

The position information derivation unit 106 selects the facility information with the highest reliability among the pieces of facility information searched for in step S505 (step S506). For example, the position information derivation unit 106 selects the facility information with the highest reliability among the pieces of facility information searched for in step S505 based on, for example, whether or not a predetermined keyword is included in a character string of a portion to which a <title> tag or a <h> tag is attached, or whether or not an emphasis tag is attached.

The position information derivation unit 106 extracts an address character string indicating an address of the facility that the user desires as a destination from the facility information selected in step S506 (step S507). For example, the position information derivation unit 106 extracts a character string to which a predetermined tag indicating an address is assigned (for example, <address>), a character string to which a predetermined keyword indicating an address (for example, "address:") is assigned, a character string matching a predetermined format regarding an address (for example, "XX-city, XX-prefecture"), or the like as the address character string indicating the address of the facility that the user desires as a destination.

The position information derivation unit 106 performs geocoding using the address character string extracted in step S507 as an input parameter to acquire the position information (latitude and longitude) corresponding to the address character string as the position information of the facility that the user desires as a destination (step S508). For example, the position information derivation unit 106 can obtain "Latitude: 35 degrees 10 minutes 14 seconds, longitude: 136 degrees 52 minutes 57 seconds" as the position information of "Nagoya station" when the geocoding is performed using a character string "1-chome 1-4, Mei-eki, Nakamura-ku, Nagoya-city, Aichi-prefecture" indicating an address of "Nagoya station" as the input parameter.

The relevant information acquisition unit 107 searches for parking lot information on the parking lot present around the position indicated by the position information acquired in step S508 from the parking lot information DB 121 (that is, the position of the facility that the user desires as the destination) (step S509: relevant information acquisition step). For example, the relevant information acquisition unit 107 searches a predetermined number (for example, five) of pieces of parking lot information in an order from the position indicated by the position information acquired in step S508 from the parking lot information DB 121. For example, the relevant information acquisition unit 107 searches for the pieces of parking lot information regarding parking lots present within a predetermined distance range (for example, within a radius of 1 km) from the position indicated by the position information acquired in step S508 from the parking lot information DB 121.

For the parking lot of which the parking lot information is searched for in step S509, the arrival time prediction unit 108 predicts an arrival time at which the vehicle of the user arrives at the parking lot (step S510: arrival time prediction step). For example, the arrival time prediction unit 108 searches for a route from the current place of the vehicle of the user specified by the current place information acquired in step S501 to the position of the parking lot specified by the position information of the parking lot of which the parking lot information is searched for in step S509 using a known route search scheme. The arrival time prediction unit 108 calculate, using a known calculation method, a movement time from the current place of the vehicle of the user to the parking lot based on the route that has been searched for and adds the calculated movement time to the current time to predict the arrival time at which the vehicle of the user arrives at the parking lot.

The vehicle information acquisition unit 109 acquires the vehicle information on the vehicle of the user (step S511: vehicle information acquisition process). For example, the vehicle information acquisition unit 109 specifies the vehicle type name and the grade of the vehicle of the user by referring to the preference information of the user stored in the preference information DB 122. The vehicle information acquisition unit 109 acquires vehicle information corresponding to the specified vehicle type name and the specified grade from an external vehicle information database (not illustrated) as the vehicle information on the vehicle of the user. The vehicle information on the vehicle of the user includes, for example, information such as a height, a width, a length, and a weight of the vehicle.

The information selection unit 110 selects the parking lot information on the parking lot available to the user among the parking lot information acquired in step S509 (step S512: selection step). For example, the information selection unit 110 selects the parking lot information on the parking lot that is open for business at the time of arrival of the vehicle of the user based on the arrival time predicted in step S510 and the hours of operation information included in the parking lot information acquired in step S509. For example, the information selection unit 110 selects the parking lot information on the parking lot in which there is currently vacancy based on the vacancy situation information included in the parking lot information acquired in step S509. For example, the information selection unit 110 selects the parking lot information for the parking lot including the restriction information in which the vehicle of the user can be parked based on the restriction information (for example, a height, a width, a length, and a weight) included in the parking lot information acquired in step S509 and the vehicle information (similarly, a height, a width, a length, and a weight) acquired in step S511.

The priority determination unit 111 determines the priority of the parking lot information (parking lot information on a parking lot available to the user) selected in step S512 based on the predetermined priority determination condition (step S513: priority determination step). For example, the priority determination unit 111 determines the priority based on the first priority determination condition in which a parking lot with a short distance from the facility desired by the user is prioritized. For example, the priority determination unit 111 determines the priority based on the second priority determination condition in which a parking lot with a low parking fee is prioritized. For example, the priority determination unit 111 determines the priority based on the third priority determination condition in which a parking lot in which the user can perform parking using a desired parking scheme (for example, single level parking garage or multilevel parking garage) is prioritized. For example, the priority determination unit 111 determines the priority based on the fourth priority determination condition in which the parking lot affiliated with the facility desired by the user is prioritized.

The information presentation unit 112 presents the parking lot information selected in step S512 to the operator in the priority order determined in step S513 (step S514: information presentation step). For example, the information presentation unit 112 transmits the parking lot information selected in step S512 to the terminal device 30 over the communication network 42 in a state in which the priority determined in step S513 can be identified. Accordingly, the information presentation unit 112 displays the parking lot information selected in step S511 on the display device 35 of the terminal device 30 in the priority order determined in step S512.

Example of Display Screen of Parking Lot Information

Figure 6:
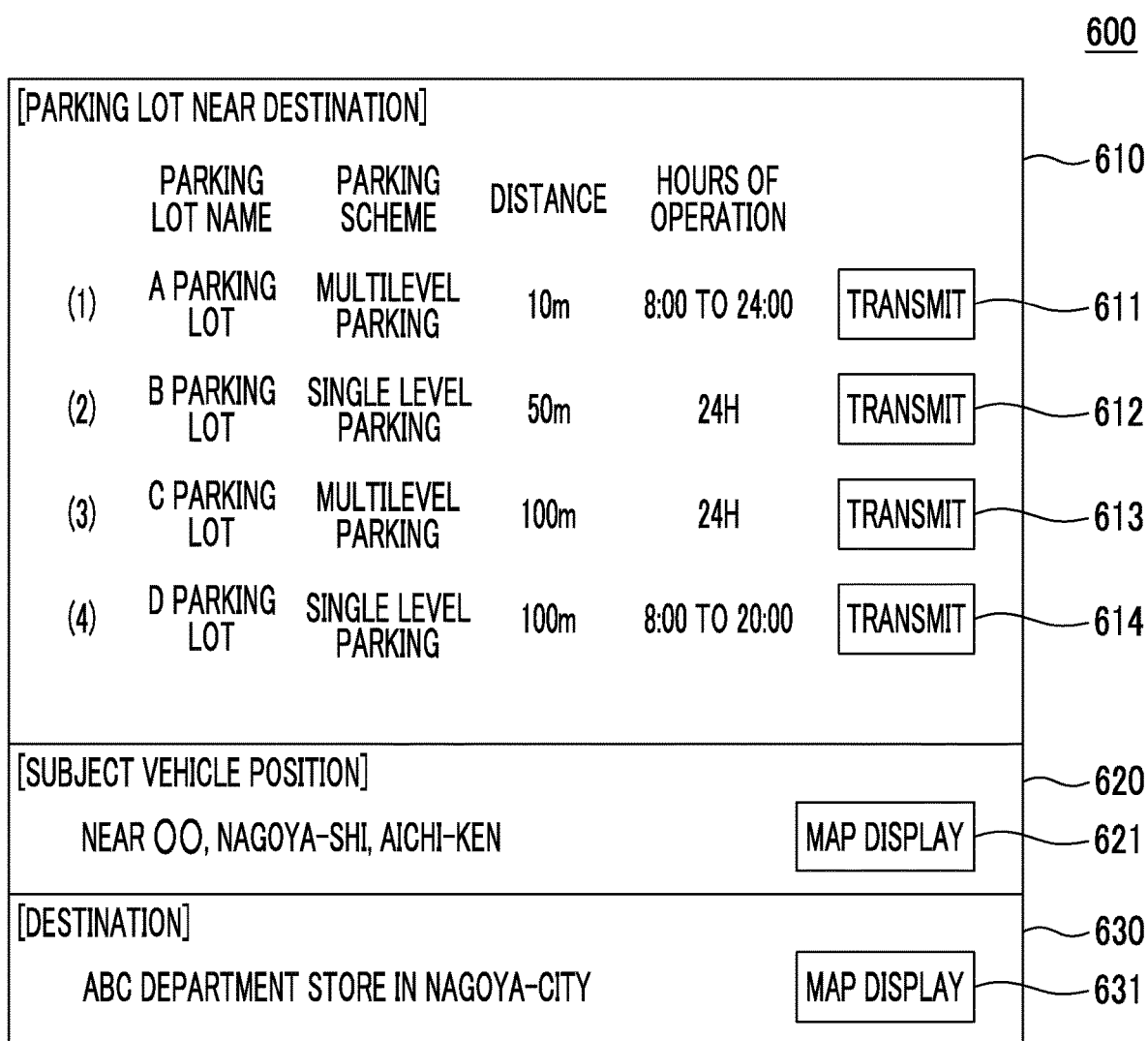
FIG. 6 is a diagram illustrating an example of a display screen for parking lot information displayed on a terminal device according to the embodiment.

FIG. 6 is a diagram illustrating an example of a display screen for the parking lot information to be displayed on the terminal device 30 according to the embodiment. A display screen 600 illustrated in FIG. 6 is an example of a display screen to be displayed on the display device 35 included in the terminal device 30 as the center server 100 performs the information providing process described with reference to FIG. 5. In the example illustrated in FIG. 6, for example, an example of a display in the terminal device 30 of the parking lot information and the facility information provided from the center server 100 as the user utters content "I would like to go to an ABC department store in Nagoya city" to the operator through a call is shown.

As illustrated in FIG. 6, the display screen 600 includes a parking lot information display area 610, a vehicle position information display area 620, and a destination information display area 630.

The parking lot information display area 610 is an area in which the parking lot information provided from the center server 100 is displayed. For example, in the example illustrated in FIG. 6, four pieces of parking lot information provided from the center server 100 are displayed in the parking lot information display area 610. The four pieces of parking lot information are information searched for from the parking lot information DB 121 by the center server 100 based on the character string "I would like to go to an ABC department store in Nagoya city" included in the speech information of the user, and are information on the parking lot present around a facility of which a facility name is "ABC department store in Nagoya". In particular, the four pieces of parking lot information are information selected as the parking lot information on the parking lot available to the user among the parking lot information searched for from the parking lot information DB 121 by the center server 100. That is, the four pieces of parking lot information are, for example, information on the parking lot that satisfies respective selection conditions such as "open for business when the vehicle arrives", "there is currently vacancy", and "restriction information in which the vehicle of the user can be parked is included".

In the example illustrated in FIG. 6, in any of the four pieces of parking lot information, the parking lot name, the parking scheme, the distance, and the hours of operation are displayed as item information. Among them, the parking lot name, the parking scheme, and the hours of operation are included in the parking lot information acquired from the parking lot information DB 121. The distance is calculated by the center server 100 and indicates a distance from the facility of which the facility name is "ABC department store in Nagoya".

In the example illustrated in FIG. 6, the four pieces of parking lot information are displayed in the priority order determined by the center server 100. For example, in the example illustrated in FIG. 6, the four pieces of parking lot information are displayed in an order of an ascending distance from the facility of which the facility name is "ABC department store in Nagoya". In addition, in the example illustrated in FIG. 6, for the parking lot information (the third parking lot information and the fourth parking lot information) having the same distance from the facility of which the facility name is "ABC department store in Nagoya", the parking lot information on the parking lot in which the user can park the vehicle using a desired parking scheme (here, the third parking lot information in which the parking scheme is "multilevel parking garage") is preferentially displayed.

In the example illustrated in FIG. 6, respective transmission buttons 611 to 614 are displayed for the four pieces of parking lot information in the parking lot information display area 610. The operator can confirm the parking lot information that the user desires to use for route guidance among the four pieces of parking lot information to the user through a call with the user. When the operator confirms the parking lot information desired by the user, the operator presses the transmission button (one of the transmission buttons 611 to 614) corresponding to the parking lot information. Accordingly, the position information included in the parking lot information desired by the user, and the position information included in the facility information of the facility of which the facility name is "ABC department store in Nagoya" (the facility that the user desires as a destination) are transmitted to the vehicle-mounted device 20. As a result, in the navigation device 24 of the vehicle-mounted device 20, the facility of which the facility name is "ABC department store in Nagoya" is set as the destination in the route guidance, and the parking lot desired by the user is set as the transit point within the route guidance.

Information on the current position of the vehicle of the user is displayed in the vehicle position information display area 620. For example, in the example illustrated in FIG. 6, an address "Near OO, Nagoya-shi, Aichi-ken" indicating the current position of the vehicle of the user is displayed on the vehicle position information display area 620. The address is an address corresponding to the current place information (latitude and longitude) obtained by the GPS unit 22 of the vehicle-mounted device 20, and is obtained through conversion from the current place information in the center server 100. In the example illustrated in FIG. 6, a map display button 621 is displayed in the vehicle position information display area 620. When the map display button 621 is pressed by the operator, a map screen for surroundings of the current position of the vehicle of the user is displayed based on the current place information (latitude and longitude) obtained by the GPS unit 22 of the vehicle-mounted device 20 on the display device 35 included in the terminal device 30. Accordingly, the operator is able to confirm the current position of the vehicle of the user on the map screen displayed on the display device 35.

In the destination information display area 630, facility information (for example, facility information of the facility that the user desires as a destination) provided from the center server 100 is displayed. In the example illustrated in FIG. 6, the facility information (solely the facility name) of which the facility name is "ABC department store in Nagoya" is displayed the destination information display area 630. The facility information is searched for from the Internet 43 by the center server 100 based on the character string "I would like to go to an ABC department store in Nagoya city" included in the speech information of the user. In the example illustrated in FIG. 6, a map display button 631 is displayed in the destination information display area 630. When the map display button 631 is pressed by the operator, a map screen for surroundings of the facility is displayed based on the position information of the facility of which the facility name is "ABC department store in Nagoya" is displayed on the display device 35 included in the terminal device 30. Accordingly, the operator is able to confirm the position of the facility of which the facility name is "ABC department store in Nagoya" on the map screen displayed on the display device 35.

As described above, with the information providing system 10 according to the embodiment, the information on the facility desired by the user (for example, the facility name or the place name) can be extracted based on speech information indicating what the user tells the operator through a call, and not only the facility information on the facility desired by the user, but also the parking lot information on the parking lot present around the facility desired by the user can be presented to the terminal device 30 of the operator based on the information on the facility desired by the user.

With the information providing system 10 according to the embodiment, it is also possible to present the parking lot information on a parking lot in which a user can actually park a vehicle (for example, a parking lot that is open for business at the time of arrival of the vehicle, a parking lot in which there is currently vacancy, and a parking lot in which the vehicle of the user can be parked) to the terminal device 30 of the operator.

With the information providing system 10 according to the embodiment, it is also possible to preferentially present parking lot information on a parking lot according to preference of the user (for example, a distance from the facility desired by the user, a parking fee, a parking scheme, or alliance with the facility) to the terminal device 30 of the operator.

Thus, with the information providing system 10 according to the embodiment, it is possible to provide an operator with not only predetermined information but also information associated with the predetermined information based on speech information indicating what the user tells the operator through a call.

While the preferred embodiments have been described above in detail, the present disclosure is not limited to these embodiments, and various modifications or changes can be made without departing from the spirit and scope of the present disclosure defined in the claims.

In the above-described embodiment, the extraction unit 104 extracts the facility name and the place name as the "first information" from the voice recognition data, but the "first information" is not limited thereto. That is, the "first information" may be any information as long as the information is information on desire of the user.

For example, the extraction unit 104 may extract "near" and "ABC department store" as the "first information" from the voice recognition data. In this case, the facility information search unit 105 may search for facility information on the "ABC department store" closest to the current place of the vehicle from the Internet 43.

For example, the extraction unit 104 may extract a telephone number as the "first information" from the voice recognition data. In this case, the facility information search unit 105 may search for facility information including the telephone number extracted by the extraction unit 104 from the Internet 43.

In the above embodiment, the relevant information acquisition unit 107 acquires the parking lot present around the facility desired by the user as the "second information", but the "second information" is not limited thereto. That is, the "second information" may be any information as long as the information is associated with the first information.

For example, the relevant information acquisition unit 107 may acquire weather information of a region around the facility desired by the user as the "second information" from the Internet 43 or the like.

For example, the relevant information acquisition unit 107 may acquire weather information of a region on a route from the current place of the vehicle to the facility desired by the user as the "second information" from the Internet 43 or the like.

For example, the relevant information acquisition unit 107 may acquire traffic information (for example, congestion information or regulatory information) on a route from the current place of the vehicle to the facility desired by the user as the "second information" from the Internet 43 or the like.

For example, the relevant information acquisition unit 107 may acquire a message (for example, "since a weather around a destination is rainy, you are recommended to prepare an umbrella") according to a weather in a region around the facility desired by the user as the "second information" from a message DB or the like that stores the above message.

For example, the relevant information acquisition unit 107 may acquire a message (for example, "since guerilla heavy rain is likely to be generated in an XX region", you are recommended to take a break in a XX service area before reaching the destination) according to weather information of a region on a route from the current place of the vehicle to the facility desired by the user as the "second information" from a message DB or the like that stores the above message.

What is claimed is:

1. An information providing method comprising:
acquiring, by an information provider, speech information indicating what a user tells an operator through a call;
generating, by the information provider, voice recognition data indicating a voice recognition result of the speech information by performing a voice recognition process on the acquired speech information;
extracting, by the information provider, first information on a desire of the user from the generated voice recognition data; and
acquiring, by the information provider, second information associated with the first extracted information,
wherein the second information is transmitted to a vehicle-mounted device that is used by the user via a terminal device that is used by the operator.

2. The information providing method according to claim 1, further comprising presenting the acquired second information to the terminal device.

3. The information providing method according to claim 1, wherein:
the first information is information on a facility; and
the second information is parking lot information on a parking lot located around the facility.

4. The information providing method according to claim 3, further comprising selecting, by the information provider, parking lot information on a parking lot available to the user among the parking lot information acquired as the second information,
wherein the information presented to the terminal device is the selected parking lot information on the parking lot available to the user.

5. The information providing method according to claim 4, further comprising:
acquiring, by the information provider, current place information indicating a current place of a vehicle of the user; and
predicting, by the information provider, an arrival time at which the vehicle of the user arrives at the parking lot based on a route from the current place of the vehicle of the user to the parking lot, the route being obtained based on a position information of the parking lot of which the parking lot information is acquired as the second information and the acquired current place information, wherein
the parking lot information includes a plurality of pieces of item information,
first item information among the pieces of item information is hours of operation information indicating hours of operation of the parking lot,
the selected parking lot information on the parking lot available to the user is parking lot information on a parking lot that is open for business at the time of arrival of the vehicle of the user, the parking lot information being selected based on the predicted arrival time, and hours of operation information included as the first item information among the parking lot information acquired as the second information, and
the information to be presented to the terminal device is the selected parking lot information on the parking lot that is open for business at the time of arrival of the vehicle of the user.

6. The information providing method according to claim 4, wherein:
the parking lot information includes a plurality of pieces of item information;
second item information among the pieces of item information is vacancy situation information indicating a vacancy situation of the parking lot;
the selected parking lot information on the parking lot available to the user is parking lot information on a parking lot in which there is currently vacancy, the parking lot information being selected based on vacancy situation information included as the second item information in the parking lot information acquired as the second information; and
the information to be presented to the terminal device is the selected parking lot information on the parking lot in which there is currently vacancy.

7. The information providing method according to claim 4, further comprising
acquiring, by the information provider, vehicle information on a vehicle of the user, wherein:
the parking lot information includes a plurality of pieces of item information;
third item information among the pieces of item information is restriction information on restriction of the vehicle in the parking lot;
the selected parking lot information on the parking lot available to the user is parking lot information on a parking lot including the restriction information in which the vehicle of the user is parked, the parking lot information being selected based on the restriction information included as the third item information in the parking lot information acquired as the second information and the acquired vehicle information; and
information to be presented to the terminal device is the selected parking lot information on the parking lot at which the vehicle of the user is parked.

8. The information providing method according to claim 3, further comprising
determining, by the information provider, a priority based on a predetermined priority determination condition with respect to the parking lot information acquired as the second information,
wherein presenting to the terminal device is presenting the acquired parking lot information to the terminal device in a priority order determined based on the predetermined priority determination condition.

9. The information providing method according to claim 8, wherein the predetermined priority determination condition includes a condition in which parking lot information on a parking lot with a short distance from the facility is prioritized with respect to the acquired parking lot information.

10. The information providing method according to claim 8, wherein the predetermined priority determination condition includes a condition in which parking lot information on a parking lot with a low parking fee is prioritized with respect to the acquired parking lot information.

11. The information providing method according to claim 8, wherein the predetermined priority determination condition includes a condition in which parking lot information on a parking lot in which a user parks a vehicle using a desired parking scheme is prioritized with respect to the acquired parking lot information.

12. The information providing method according to claim 8, wherein the predetermined priority determination condition includes a condition in which parking lot information on a parking lot affiliated with the facility is prioritized with respect to the acquired parking lot information.

13. An information providing system comprising
a vehicle-mounted device that is used by a user,
a terminal device that is used by an operator, and
an information provider configured to:
acquire speech information from the terminal device, the speech information indicating what the user tells to the operator through a call from the vehicle-mounted device;
generate voice recognition data indicating a voice recognition result of the speech information by performing a voice recognition process on the acquired speech information;
extract first information on a desire of the user from the generated voice recognition data; and
acquire second information associated with the first extracted information,
wherein the second information is transmitted to the vehicle-mounted device via the terminal device.

14. An information providing device comprising
a processing circuit configured to:
acquire speech information indicating what a user tells an operator through a call;
generate voice recognition data indicating a voice recognition result of the speech information by performing a voice recognition process on the acquired speech information;
extract first information on a desire of the user from the generated voice recognition data; and
acquire second information associated with the first extracted information, wherein the second information is transmitted to a vehicle-mounted device that is used by the user via a terminal device that is used by the operator.

* * * * *